US010930241B2

(12) United States Patent
Olson et al.

(10) Patent No.: US 10,930,241 B2
(45) Date of Patent: Feb. 23, 2021

(54) COLOR MONITOR SETTINGS REFRESH

(71) Applicant: Leica Biosystems Imaging, Inc., Vista, CA (US)

(72) Inventors: Allen Olson, San Diego, CA (US); Ruben Campos Zurriaga, Dublin (IR); Reiner Jung, San Diego, CA (US)

(73) Assignee: LEICA BIOSYSTEMS IMAGING, INC., Vista, CA (US)

( * ) Notice: Subject to any disclaimer, the term of this patent is extended or adjusted under 35 U.S.C. 154(b) by 0 days.

(21) Appl. No.: 16/206,478

(22) Filed: Nov. 30, 2018

(65) Prior Publication Data
US 2019/0164519 A1    May 30, 2019

Related U.S. Application Data

(60) Provisional application No. 62/593,083, filed on Nov. 30, 2017.

(51) Int. Cl.
*G09G 5/00* (2006.01)
*G09G 5/02* (2006.01)
*G02B 21/36* (2006.01)

(52) U.S. Cl.
CPC .......... *G09G 5/003* (2013.01); *G09G 5/02* (2013.01); *G02B 21/368* (2013.01);
(Continued)

(58) Field of Classification Search
CPC .. G02B 21/367; G02B 21/368; G09G 3/2003; G09G 3/3607; G09G 5/02; G09G 5/026;
(Continued)

(56) References Cited

U.S. PATENT DOCUMENTS 6,052,740 A    4/2000    Frederick
6,618,773 B1    9/2003    Chang et al.
(Continued)

FOREIGN PATENT DOCUMENTS

WO    2003019307 A1    3/2003
WO    2006052061 A1    5/2006
(Continued)

OTHER PUBLICATIONS

Raskar et al, "The Office of the Future: A Unified Approach to Image-Based Modeling and Spatially Immersive Displays", University of North Carolina at Chapel Hill and the NSF Science and Technology Center for Computer Graphics and Scientific Visualization, 1998 (Year: 1998).*
(Continued)

*Primary Examiner* — Diane M Wills
(74) *Attorney, Agent, or Firm* — Procopio; Pattric J. Rawlins; Jonathan D. Cheng (57) ABSTRACT

Described herein are systems and methods that place a known color monitor (known by unique serial number or SKU) into a desired state for displaying digital pathology image data. Using an application programming interface, any color monitor that implements MCCS can be calibrated and characterized immediately before each display of digital pathology image data and can also be periodically reset (if needed) during display of digital pathology image data.

9 Claims, 2 Drawing Sheets

(52) U.S. Cl.
CPC ............. *G09G 2320/0666* (2013.01); *G09G 2320/0693* (2013.01); *G09G 2320/08* (2013.01); *G09G 2380/08* (2013.01)

(58) Field of Classification Search
CPC ............. G09G 5/10; G09G 2320/0666; G09G 2320/0673; G09G 2320/0693; G09G 2320/08; G09G 2340/06; G09G 2370/04; G09G 2370/042; G09G 2370/047; G09G 2380/08; H04N 17/00; H04N 17/002; H04N 17/004; H04N 17/04; H04N 5/217; G06F 3/0362
USPC .................................................. 348/180, 187
See application file for complete search history.

(56) References Cited

U.S. PATENT DOCUMENTS

| | | | |
|---|---|---|---|
| 6,697,033 B1 | 2/2004 | Leung et al. | |
| 6,836,268 B1 | 12/2004 | Song | |
| 7,009,616 B2 | 3/2006 | Mendelson et al. | |
| 7,133,546 B2 | 11/2006 | Dehmeshki et al. | |
| 7,138,989 B2 | 11/2006 | Mendelson et al. | |
| 7,382,379 B1 | 6/2008 | Edge et al. | |
| 7,453,601 B2 | 11/2008 | Kurumisawa et al. | |
| 7,525,540 B2 | 4/2009 | Song | |
| 7,538,762 B2 | 5/2009 | Fletcher et al. | |
| 7,796,095 B2 | 9/2010 | Glen | |
| 7,812,832 B2 | 10/2010 | Mendelson et al. | |
| 8,013,805 B2 | 9/2011 | Piazza et al. | |
| 8,069,276 B2 | 11/2011 | Kang et al. | |
| 8,159,415 B2 | 4/2012 | Choi et al. | |
| 8,255,580 B2 | 8/2012 | Kang et al. | |
| 8,279,236 B2 | 10/2012 | Holub | |
| 8,319,757 B2 | 11/2012 | Choi | |
| 8,363,044 B2 | 1/2013 | Fletcher et al. | |
| 8,456,395 B2 | 6/2013 | Liu | |
| 8,634,677 B2 | 1/2014 | Hu et al. | |
| 8,638,340 B2 | 1/2014 | Holub | |
| 8,665,289 B2 | 3/2014 | Holub | |
| 8,723,874 B2 | 5/2014 | Day et al. | |
| 8,860,707 B2 | 10/2014 | Fletcher et al. | |
| 8,890,877 B2 | 11/2014 | Fu et al. | |
| 8,896,581 B2 | 11/2014 | Choi | |
| 8,917,294 B2 | 12/2014 | Tsai | |
| 9,083,875 B2 | 7/2015 | Salisbury et al. | |
| 9,218,784 B2 | 12/2015 | Myers | |
| 9,336,745 B2 | 5/2016 | Choi | |
| 2003/0058250 A1* | 3/2003 | Adams, Jr. ............ G06K 15/02 345/589 | |
| 2006/0104016 A1* | 5/2006 | Jang ...................... F16M 11/18 361/679.22 | |
| 2012/0218320 A1 | 8/2012 | Evanicky et al. | |
| 2012/0229526 A1* | 9/2012 | Holmes ................... G06F 3/14 345/690 | |
| 2014/0139541 A1 | 5/2014 | Willaert et al. | |
| 2016/0086572 A1 | 3/2016 | Nasiriavanaki et al. | |
| 2017/0085852 A1* | 3/2017 | Holub ...................... G01J 3/02 | |
| 2018/0027148 A1* | 1/2018 | Kimpe ..................... G09G 5/02 382/167 | |

FOREIGN PATENT DOCUMENTS

WO      2016008825 A1      1/2016
WO      2017184821 A1      10/2017

OTHER PUBLICATIONS

International Search Report and Written Opinion dated Feb. 21, 2019 for related International Application No. PCT/US2018/063456, in 14 pages.

* cited by examiner

COLOR MONITOR SETTINGS REFRESH

CROSS-REFERENCE TO RELATED APPLICATIONS

This application claims priority to U.S. Provisional Patent Application No. 62/593,083, filed on Nov. 30, 2017, which is hereby incorporated herein by reference as if set forth in full.

BACKGROUND

Field of the Invention

The present invention generally relates to digital pathology and more particularly relates to calibrating and characterizing color monitors used to display digital pathology image data.

Related Art

Digital pathology is an image-based information environment which is enabled by computer technology that allows for the management of information generated from a physical slide. Digital pathology is enabled in part by virtual microscopy, which is the practice of scanning a specimen on a physical glass slide and creating a digital slide image that can be stored, viewed, managed, and analyzed on a computer monitor. With the capability of imaging an entire glass slide, the field of digital pathology has exploded and is currently regarded as one of the most promising avenues of diagnostic medicine in order to achieve even better, faster and cheaper diagnosis, prognosis and prediction of important diseases such as cancer.

Viewing digital pathology image data on a color monitor is an important aspect of diagnostic medicine. However, sometimes the color settings of a color monitor may change, whether by accident or intentional. For example, a user of a color monitor may accidentally or intentionally change the color monitor settings. Alternatively, certain computer programs may change the color monitor settings. The fact that color monitor settings are subject to random change is a significant drawback for the digital pathology industry, which requires a very tightly controlled environment for diagnostic medicine. Therefore, what is needed is a system and method that overcomes these significant problems found in the conventional systems as described above.

SUMMARY

Accordingly, to address the significant problems caused by the lack of control over the monitor settings and the need in the digital pathology industry to very precisely control the color calibration and characterization of each monitor for primary diagnosis of pathology image data, described herein are systems and methods to refresh the color monitor settings on a color monitor being used to display digital pathology image data.

Calibration of a color monitor means putting the color monitor into a known state. Characterization of a color monitor means making the monitor display whatever is desired. The Video Electronics Standards Association ("VESA") established the Monitor Control Command Set ("MCCS") and many color monitors have adapted the MCCS for use in their color monitors. Additionally, the International Color Consortium ("ICC") established a profile for color images so that color images displayed on different monitors can be displayed using the same colors.

In the presently described systems and methods, a color monitor is initially configured prior to being provided to a customer. The initial configuration places the color monitor into an approved settings state where the calibration and characterization of the color monitor are approved to display digital pathology image data. The unique serial number of the color monitor is stored in a database and when a request is subsequently made to display digital pathology image data on the color monitor, the viewing software obtains the unique serial number of the color monitor and the unique serial number is compared to the database to confirm that the specific color monitor was originally configured into the approved settings state. If the unique serial number matches, the current settings of the monitor are obtained and compared to the approved settings state. If a difference between the current settings and the approved settings state exceeds a predetermined threshold, the color monitor is reconfigured and placed back into the approved settings state prior to the display of digital pathology image data. In one embodiment, any difference for any variable results in reconfiguring the color monitor. In one embodiment, any difference for one or more specific variables results in reconfiguring the color monitor, while differences for other variables does not result in reconfiguring the color monitor. In one embodiment, one or more specific variables are effectively ignored such that any difference for the one or more specific variables does not result in reconfiguring the color monitor.

Additionally, during the display of digital pathology image data, the viewing software periodically checks the current settings of the color monitor and compares them to the approved settings state. If a difference between the current settings and the approved settings state exceeds a predetermined threshold, the color monitor is reconfigured and placed back into the approved settings state for continued display of digital pathology image data. In one embodiment, any difference for any variable results in reconfiguring the color monitor. In one embodiment, any difference for one or more specific variables results in reconfiguring the color monitor. In one embodiment, one or more specific variables are effectively ignored such that any difference for the one or more specific variables does not result in reconfiguring the color monitor.

The systems and methods described herein advantageously place a known color monitor (e.g., known by its unique serial number from the factory configuration of the color monitor) into the desired state at the desired time. Using an application programming interface, the color monitor that implements MCCS can be calibrated and characterized immediately before each display of digital pathology image data and periodically reset (if needed) during display of digital pathology image data.

Accordingly, in an embodiment, a method for viewing digital pathology images includes configuring a plurality of variables of a first color monitor having a unique serial number to an approved settings state prior to providing the first color monitor to a recipient for use as a viewing device for digital pathology images. The method further includes storing the unique serial number in association with an indication that the first color monitor has been configured to the approved settings state. Then, each time digital pathology image data is requested to be displayed on the first color monitor, the unique serial number of the first color monitor is obtained from the first color monitor and the unique serial number is matched to the previously stored unique serial number. Additionally, current variable settings are obtained from the first color monitor and compared to the variable settings of the approved settings state. If a difference between the current variable settings and the variable settings of the approved settings state exceeds a predetermined threshold, the plurality of variables of the first color monitor are reconfigured to the approved settings state and then the requested digital pathology image data is provided for display on the first color monitor.

In some embodiments, the plurality of variables may be monitor control command set variables or international color consortium variables. In some embodiments, while the digital pathology image data continues to be displayed, the current variable settings are periodically obtained from the first color monitor and compared to the variable settings of the approved settings state. If the current variable settings are different from the variable settings of the approved settings state, the plurality of variables of the first color monitor are reconfigured to the approved settings state.

In some embodiments, the initial configuring of the plurality of variables of the first color monitor to an approved settings state includes setting each monitor control command set variable to a desired value or setting fewer than all of the monitor control command set variables to a desired value.

In some embodiments, the initial configuring of the plurality of variables of the first color monitor to an approved settings state includes generating an international color consortium profile for the first color monitor and reconfiguring.

In some embodiments, the initial configuring of the plurality of variables of the first color monitor to an approved settings state comprises applying an international color consortium profile corresponding to a stock keeping unit number for the first color monitor.

Other features and advantages of the present invention will become more readily apparent to those of ordinary skill in the art after reviewing the following detailed description and accompanying drawings.

BRIEF DESCRIPTION OF THE DRAWINGS

The structure and operation of the present invention will be understood from a review of the following detailed description and the accompanying drawings in which like reference numerals refer to like parts and in which.

DETAILED DESCRIPTION

Certain embodiments disclosed herein provide for systems and methods for refreshing color monitor settings for viewing of digital pathology image data. For example, one method disclosed herein allows for a color monitor to be originally configured prior to deployment and then each time that specific color monitor (e.g., as determined by a unique serial number) requests to view digital pathology image data, the color monitor settings for the color monitor are evaluated and reset if necessary to place the color monitor into an approve settings state for displaying digital pathology image data. After reading this description it will become apparent to one skilled in the art how to implement the invention in various alternative embodiments and alternative applications. However, although various embodiments of the present invention will be described herein, it is understood that these embodiments are presented by way of example only, and not limitation. As such, this detailed description of various alternative embodiments should not be construed to limit the scope or breadth of the present invention as set forth in the appended claims.

1. Example Method

Figure 1A:
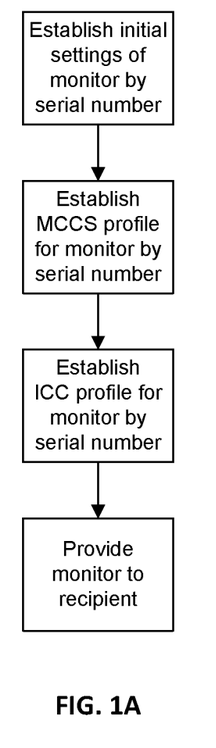
FIG. 1A is a flow diagram illustrating an example process for initial configuration of a monitor for viewing digital pathology images according to an embodiment.

FIG. 1A is a flow diagram illustrating an example process for initial configuration of a monitor for viewing digital pathology images according to an embodiment. Initially, in the illustrated embodiment the color monitor settings are established prior to providing the color monitor to the recipient. Additionally, an MCCS profile for the color monitor is established and associated with the unique serial number of the color monitor. Similarly, an ICC profile is also established for the color monitor and associated with the unique serial number of the color monitor. Accordingly, once the color monitor has been calibrated and characterized so that the color monitor is in an approved settings state, the color monitor is provided to the recipient. In one embodiment, providing the color monitor to a recipient includes shipping the color monitor to a customer as part of a digital pathology system product.

Additionally, for each color monitor that is configured prior to providing the color monitor to a recipient, a unique serial number associated with each respective color monitor is stored in a database or other data structure. This allows future validation requests to be confirmed, for example by way of matching the unique serial number of a color monitor. Alternatively, or additionally, the stock keeping unit ("SKU") of a particular type of color monitor can be stored and subsequently used to confirm a validation request.

Figure 1B:
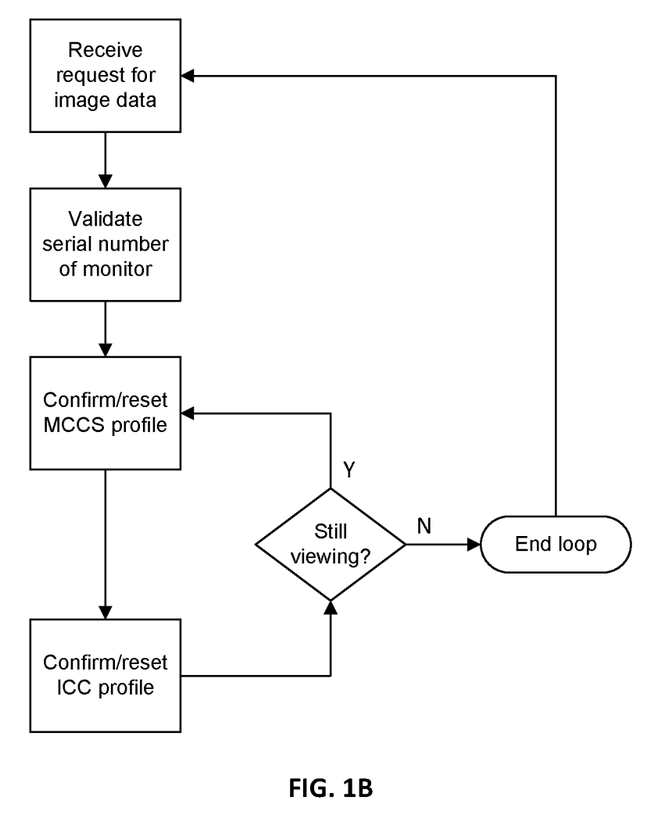
FIG. 1B is a flow diagram illustrating an example process for enforcing color monitor settings for viewing digital pathology images according to an embodiment.

FIG. 1B is a flow diagram illustrating an example process for enforcing color monitor settings for viewing digital pathology images according to an embodiment. Initially, in the illustrated embodiment a request is received for digital pathology image data that is to be displayed on a target color monitor. In one embodiment, a user interview (e.g., a viewing software utility) is operating on a user station to display information including digital pathology image data on the target color monitor. Subsequent to receiving the request for digital pathology image data, the user interface or other utility on the user station obtains the unique serial number of the color monitor and validates the unique serial number of the color monitor, for example by comparing it to a database of unique serial numbers for color monitors that have been configured prior to providing the color monitor to the recipient as previously described. Alternatively, the color monitor can also be validated by way of a SKU number match instead of a unique serial number match, where the SKU number is unique to all monitors of a specific type.

Once the color monitor has been validated, for example by way of unique serial number matching or SKU matching, the settings of the color monitor are obtained and compared to the approved settings state. For example, each color monitor variable may be compared to the same variable in the approved settings state. Additionally, the MCCS variables may be compared and/or the ICC variables may be compared. If the variable values in the current settings of the color monitor are not the same as the variable values of the approved settings state, the color monitor is re-calibrated and re-characterized to place the color monitor back into the approved settings state prior to display of digital pathology image data. Furthermore, while the color monitor continues to display digital pathology image data, the current settings of the color monitor are periodically obtained and the variable values of the current settings are again compared to the variable values of the approved settings state. If the variable values of the current settings differ from the variable values of the approved settings state, the color monitor is once again re-calibrated and re-characterized to place the color monitor back into the approved settings state during display of digital pathology image data. When the digital pathology image data is no longer being viewed, the process starts over when a new request for digital pathology image data is received.

2. Example Embodiments

In one embodiment, a method for viewing digital pathology images on a first color monitor includes, prior to providing the first color monitor to a recipient for use as a viewing device for digital pathology images, configuring a plurality of variables of the first color monitor to an approved settings state. The first color monitor has a unique serial number. The method also includes storing the unique serial number in association with an indication that the first color monitor has been configured to the approved settings state. The method also includes, each time digital pathology image data is requested to be displayed on the first color monitor, obtaining the unique serial number of the first color monitor from the first color monitor and matching the unique serial number to the previously stored unique serial number. If there is a match, the current variable settings are obtained from the first color monitor and the current variable settings are compared to the variable settings of the approved settings state. If the current variable settings are different from the variable settings of the approved settings state, the plurality of variables of the first color monitor are reconfigured to the approved settings state. After the current variable settings are confirmed to be the same as the variable settings of the approved settings state or are reset to be the same as the variable settings of the approved settings state, the requested digital pathology image data is provided for display on the first color monitor.

In one embodiment, the plurality of variables comprises monitor control command set (MCCS) variables. Additionally, in one embodiment configuring a plurality of variables of the first color monitor to an approved settings state comprises setting each monitor control command set (MCCS) variable to a desired value. Additionally, in one embodiment configuring a plurality of variables of the first color monitor to an approved settings state comprises initializing the first color monitor to a factory state and setting fewer than all of the monitor control command set (MCCS) variables to a desired value.

In one embodiment, the plurality of variables comprises international color consortium (ICC) variables. Additionally, in one embodiment configuring a plurality of variables of the first color monitor to an approved settings state comprises generating international color consortium (ICC) profile for the first color monitor. Additionally, in one embodiment, configuring a plurality of variables of the first color monitor to an approved settings state comprises applying an international color consortium (ICC) profile corresponding to a stock keeping unit (SKU) number for the first color monitor.

In one embodiment, while the digital pathology image data continues to be displayed, the method also includes periodically obtaining current variable settings from the first color monitor, comparing the current variable settings to the variable settings of the approved settings state, and if the current variable settings are different from the variable settings of the approved settings state, configuring the plurality of variables of the first color monitor to the approved settings state.

3. Example Digital Slide Scanning Apparatus

Figure 2A:
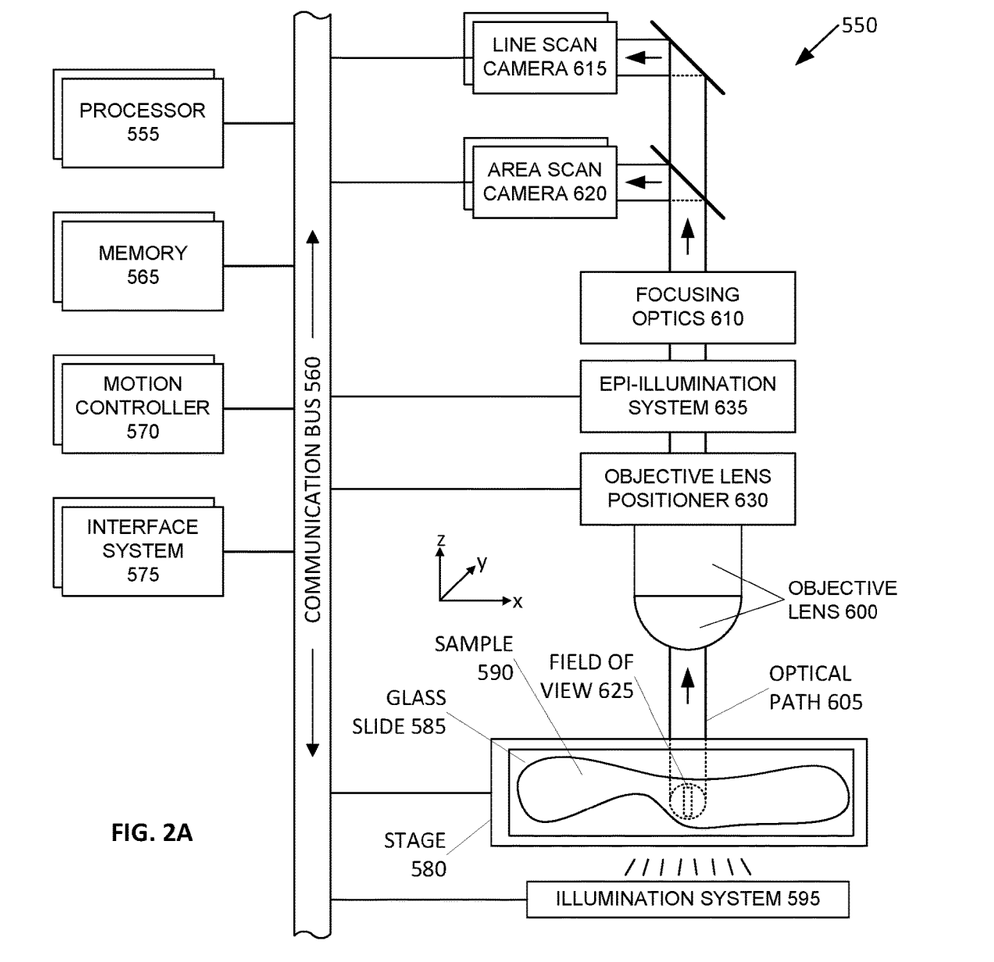
FIG. 2A is a block diagram illustrating an example processor enabled device 550 that may be used in connection with various embodiments described herein.

FIG. 2A is a block diagram illustrating an example processor enabled device 550 that may be used in connection with various embodiments described herein. Alternative forms of the device 550 may also be used as will be understood by the skilled artisan. In the illustrated embodiment, the device 550 is presented as a digital imaging device (also referred to as a digital slide scanning apparatus, digital slide scanner, scanner, scanner system or a digital imaging device, etc.) that comprises one or more processors 555, one or more memories 565, one or more motion controllers 570, one or more interface systems 575, one or more movable stages 580 that each support one or more glass slides 585 with one or more samples 590, one or more illumination systems 595 that illuminate the sample, one or more objective lenses 600 that each define an optical path 605 that travels along an optical axis, one or more objective lens positioners 630, one or more optional epi-illumination systems 635 (e.g., included in a fluorescence scanner system), one or more focusing optics 610, one or more line scan cameras 615 and/or one or more area scan cameras 620, each of which define a separate field of view 625 on the sample 590 and/or glass slide 585. The various elements of the scanner system 550 are communicatively coupled via one or more communication busses 560. Although there may be one or more of each of the various elements of the scanner system 550, for simplicity in the description, these elements will be described in the singular except when needed to be described in the plural to convey the appropriate information.

The one or more processors 555 may include, for example, a central processing unit ("CPU") and a separate graphics processing unit ("GPU") capable of processing instructions in parallel or the one or more processors 555 may include a multicore processor capable of processing instructions in parallel. Additional separate processors may also be provided to control particular components or perform particular functions such as image processing. For example, additional processors may include an auxiliary processor to manage data input, an auxiliary processor to perform floating point mathematical operations, a special-purpose processor having an architecture suitable for fast execution of signal processing algorithms (e.g., digital signal processor), a slave processor subordinate to the main processor (e.g., back-end processor), an additional processor for controlling the line scan camera 615, the stage 580, the objective lens 225, and/or a display (not shown). Such additional processors may be separate discrete processors or may be integrated with the processor 555.

The memory 565 provides storage of data and instructions for programs that can be executed by the processor 555. The memory 565 may include one or more volatile and/or non-volatile computer-readable storage mediums that store the data and instructions, including, for example, a random access memory, a read only memory, a hard disk drive, removable storage drive, and the like. The processor 555 is configured to execute instructions that are stored in memory 565 and communicate via communication bus 560 with the various elements of the scanner system 550 to carry out the overall function of the scanner system 550.

The one or more communication busses 560 may include a communication bus 560 that is configured to convey analog electrical signals and may include a communication bus 560 that is configured to convey digital data. Accordingly, communications from the processor 555, the motion controller 570, and/or the interface system 575 via the one or more communication busses 560 may include both electrical signals and digital data. The processor 555, the motion controller 570, and/or the interface system 575 may also be configured to communicate with one or more of the various elements of the scanning system 550 via a wireless communication link.

The motion control system 570 is configured to precisely control and coordinate XYZ movement of the stage 580 and the objective lens 600 (e.g., via the objective lens positioner 630). The motion control system 570 is also configured to control movement of any other moving part in the scanner system 550. For example, in a fluorescence scanner embodiment, the motion control system 570 is configured to coordinate movement of optical filters and the like in the epi-illumination system 635.

The interface system 575 allows the scanner system 550 to interface with other systems and human operators. For example, the interface system 575 may include a user interface to provide information directly to an operator and/or to allow direct input from an operator. The interface system 575 is also configured to facilitate communication and data transfer between the scanning system 550 and one or more external devices that are directly connected (e.g., a printer, removable storage medium, etc.) or external devices such as an image server system, an operator station, a user station, and an administrative server system that are connected to the scanner system 550 via a network (not shown).

The illumination system 595 is configured to illuminate a portion of the sample 590. The illumination system 595 may include, for example, a light source and illumination optics. The light source could be a variable intensity halogen light source with a concave reflective mirror to maximize light output and a KG-1 filter to suppress heat. The light source could also be any type of arc-lamp, laser, or other source of light. In an embodiment, the illumination system 595 illuminates the sample 590 in transmission mode such that the line scan camera 615 and/or area scan camera 620 sense optical energy that is transmitted through the sample 590. Alternatively, or additionally, the illumination system 595 may be configured to illuminate the sample 590 in reflection mode such that the line scan camera 615 and/or area scan camera 620 sense optical energy that is reflected from the sample 590. Overall, the illumination system 595 is configured to be suitable for interrogation of the microscopic sample 590 in any known mode of optical microscopy.

In an embodiment, the scanner system 550 optionally includes an epi-illumination system 635 to optimize the scanner system 550 for fluorescence scanning. Fluorescence scanning is the scanning of samples 590 that include fluorescence molecules, which are photon sensitive molecules that can absorb light at a specific wavelength (excitation). These photon sensitive molecules also emit light at a higher wavelength (emission). Because the efficiency of this photoluminescence phenomenon is very low, the amount of emitted light is often very low. This low amount of emitted light typically frustrates conventional techniques for scanning and digitizing the sample 590 (e.g., transmission mode microscopy). Advantageously, in an optional fluorescence scanner system embodiment of the scanner system 550, use of a line scan camera 615 that includes multiple linear sensor arrays (e.g., a time delay integration ("TDI") line scan camera) increases the sensitivity to light of the line scan camera by exposing the same area of the sample 590 to each of the multiple linear sensor arrays of the line scan camera 615. This is particularly useful when scanning faint fluorescence samples with low emitted light.

Accordingly, in a fluorescence scanner system embodiment, the line scan camera 615 is preferably a monochrome TDI line scan camera. Advantageously, monochrome images are ideal in fluorescence microscopy because they provide a more accurate representation of the actual signals from the various channels present on the sample. As will be understood by those skilled in the art, a fluorescence sample 590 can be labeled with multiple florescence dyes that emit light at different wavelengths, which are also referred to as "channels."

Furthermore, because the low and high end signal levels of various fluorescence samples present a wide spectrum of wavelengths for the line scan camera 615 to sense, it is desirable for the low and high end signal levels that the line scan camera 615 can sense to be similarly wide. Accordingly, in a fluorescence scanner embodiment, a line scan camera 615 used in the fluorescence scanning system 550 is a monochrome 10 bit 64 linear array TDI line scan camera. It should be noted that a variety of bit depths for the line scan camera 615 can be employed for use with a fluorescence scanner embodiment of the scanning system 550.

The movable stage 580 is configured for precise X-Y axes movement under control of the processor 555 or the motion controller 570. The movable stage may also be configured for movement in a Z axis under control of the processor 555 or the motion controller 570. The moveable stage is configured to position the sample in a desired location during image data capture by the line scan camera 615 and/or the area scan camera. The moveable stage is also configured to accelerate the sample 590 in a scanning direction to a substantially constant velocity and then maintain the substantially constant velocity during image data capture by the line scan camera 615. In an embodiment, the scanner system 550 may employ a high precision and tightly coordinated X-Y grid to aid in the location of the sample 590 on the movable stage 580. In an embodiment, the movable stage 580 is a linear motor based X-Y stage with high precision encoders employed on both the X and the Y axis. For example, very precise nanometer encoders can be used on the axis in the scanning direction and on the axis that is in the direction perpendicular to the scanning direction and on the same plane as the scanning direction. The stage is also configured to support the glass slide 585 upon which the sample 590 is disposed.

The sample 590 can be anything that may be interrogated by optical microscopy. For example, a glass microscope slide 585 is frequently used as a viewing substrate for specimens that include tissues and cells, chromosomes, DNA, protein, blood, bone marrow, urine, bacteria, beads, biopsy materials, or any other type of biological material or substance that is either dead or alive, stained or unstained, labeled or unlabeled. The sample 590 may also be an array of any type of DNA or DNA-related material such as cDNA, RNA or protein that is deposited on any type of slide or other substrate, including any and all samples commonly known as microarrays. The sample 590 may be a microtiter plate, for example a 96-well plate. Other examples of the sample 590 include integrated circuit boards, electrophoresis records, petri dishes, film, semiconductor materials, forensic materials, and machined parts.

Objective lens 600 is mounted on the objective positioner 630 which, in an embodiment, may employ a very precise linear motor to move the objective lens 600 along the optical axis defined by the objective lens 600. For example, the linear motor of the objective lens positioner 630 may include a 50 nanometer encoder. The relative positions of the stage 580 and the objective lens 600 in XYZ axes are coordinated and controlled in a closed loop manner using motion controller 570 under the control of the processor 555 that employs memory 565 for storing information and instructions, including the computer-executable programmed steps for overall operation of the scanning system 550.

In an embodiment, the objective lens 600 is a plan apochromatic ("APO") infinity corrected objective with a numerical aperture corresponding to the highest spatial resolution desirable, where the objective lens 600 is suitable for transmission mode illumination microscopy, reflection mode illumination microscopy, and/or epi-illumination mode fluorescence microscopy (e.g., an Olympus 40×, 0.75NA or 20×, 0.75 NA). Advantageously, objective lens 600 is capable of correcting for chromatic and spherical aberrations. Because objective lens 600 is infinity corrected, focusing optics 610 can be placed in the optical path 605 above the objective lens 600 where the light beam passing through the objective lens becomes a collimated light beam. The focusing optics 610 focus the optical signal captured by the objective lens 600 onto the light-responsive elements of the line scan camera 615 and/or the area scan camera 620 and may include optical components such as filters, magnification changer lenses, and/or the like. The objective lens 600 combined with focusing optics 610 provides the total magnification for the scanning system 550. In an embodiment, the focusing optics 610 may contain a tube lens and an optional 2× magnification changer. Advantageously, the 2× magnification changer allows a native 20× objective lens 600 to scan the sample 590 at 40× magnification.

The line scan camera 615 comprises at least one linear array of picture elements ("pixels"). The line scan camera may be monochrome or color. Color line scan cameras typically have at least three linear arrays, while monochrome line scan cameras may have a single linear array or plural linear arrays. Any type of singular or plural linear array, whether packaged as part of a camera or custom-integrated into an imaging electronic module, can also be used. For example, a 3 linear array ("red-green-blue" or "RGB") color line scan camera or a 96 linear array monochrome TDI may also be used. TDI line scan cameras typically provide a substantially better signal-to-noise ratio ("SNR") in the output signal by summing intensity data from previously imaged regions of a specimen, yielding an increase in the SNR that is in proportion to the square-root of the number of integration stages. TDI line scan cameras comprise multiple linear arrays. For example, TDI line scan cameras are available with 24, 32, 48, 64, 96, or even more linear arrays. The scanner system 550 also supports linear arrays that are manufactured in a variety of formats including some with 512 pixels, some with 1024 pixels, and others having as many as 4096 pixels. Similarly, linear arrays with a variety of pixel sizes can also be used in the scanner system 550. The salient requirement for the selection of any type of line scan camera 615 is that the motion of the stage 580 can be synchronized with the line rate of the line scan camera 615 so that the stage 580 can be in motion with respect to the line scan camera 615 during the digital image capture of the sample 590.

The image data generated by the line scan camera 615 is stored in a portion of the memory 565 and processed by the processor 555 to generate a contiguous digital image of at least a portion of the sample 590. The contiguous digital image can be further processed by the processor 555 and the processed contiguous digital image can also be stored in the memory 565.

In an embodiment with two or more line scan cameras 615, at least one of the line scan cameras 615 can be configured to function as a focusing sensor that operates in combination with at least one of the line scan cameras 615 that is configured to function as an imaging sensor. The focusing sensor can be logically positioned on the same optical axis as the imaging sensor or the focusing sensor may be logically positioned before or after the imaging sensor with respect to the scanning direction of the scanner system 550. In an embodiment with at least one line scan camera 615 functioning as a focusing sensor, the image data generated by the focusing sensor is stored in a portion of the memory 565 and processed by the one or more processors 555 to generate focus information to allow the scanner system 550 to adjust the relative distance between the sample 590 and the objective lens 600 to maintain focus on the sample during scanning. Additionally, in an embodiment the at least one line scan camera 615 functioning as a focusing sensor may be oriented such that each of a plurality of individual pixels of the focusing sensor is positioned at a different logical height along the optical path 605.

In operation, the various components of the scanner system 550 and the programmed modules stored in memory 565 enable automatic scanning and digitizing of the sample 590, which is disposed on a glass slide 585. The glass slide 585 is securely placed on the movable stage 580 of the scanner system 550 for scanning the sample 590. Under control of the processor 555, the movable stage 580 accelerates the sample 590 to a substantially constant velocity for sensing by the line scan camera 615, where the speed of the stage is synchronized with the line rate of the line scan camera 615. After scanning a stripe of image data, the movable stage 580 decelerates and brings the sample 590 to a substantially complete stop. The movable stage 580 then moves orthogonal to the scanning direction to position the sample 590 for scanning of a subsequent stripe of image data, e.g., an adjacent stripe. Additional stripes are subsequently scanned until an entire portion of the sample 590 or the entire sample 590 is scanned.

For example, during digital scanning of the sample 590, a contiguous digital image of the sample 590 is acquired as a plurality of contiguous fields of view that are combined together to form an image strip. A plurality of adjacent image strips are similarly combined together to form a contiguous digital image of a portion of the sample 590 or the entire sample 590. The scanning of the sample 590 may include acquiring vertical image strips or horizontal image strips. The scanning of the sample 590 may be either top-to-bottom, bottom-to-top, or both (bi-directional) and may start at any point on the sample. Alternatively, the scanning of the sample 590 may be either left-to-right, right-to-left, or both (bi-directional) and may start at any point on the sample. Additionally, it is not necessary that image strips be acquired in an adjacent or contiguous manner. Furthermore, the resulting image of the sample 590 may be an image of the entire sample 590 or only a portion of the sample 590.

In an embodiment, computer-executable instructions (e.g., programmed modules or other software) are stored in the memory 565 and, when executed, enable the scanning system 550 to perform the various functions described herein. In this description, the term "computer-readable storage medium" is used to refer to any media used to store and provide computer executable instructions to the scanning system 550 for execution by the processor 555. Examples of these media include memory 565 and any removable or external storage medium (not shown) communicatively coupled with the scanning system 550 either directly or indirectly (e.g., via a network).

Figure 2B:
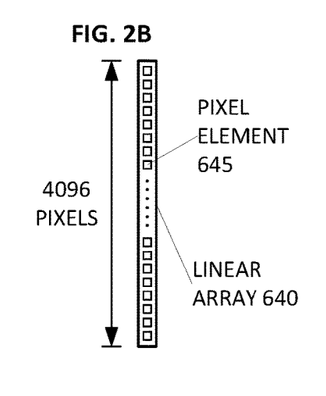
FIG. 2B is a block diagram illustrating an example line scan camera having a single linear array.

FIG. 2B illustrates a line scan camera having a single linear array 640, which may be implemented as a charge coupled device ("CCD") array. The single linear array 640 comprises a plurality of individual pixels 645. In the illustrated embodiment, the single linear array 640 has 4096 pixels. In alternative embodiments, linear array 640 may have more or fewer pixels. For example, common formats of linear arrays include 512, 1024, and 4096 pixels. The pixels 645 are arranged in a linear fashion to define a field of view 625 for the linear array 640. The size of the field of view varies in accordance with the magnification of the scanner system 550.

Figures 2C, 2D:
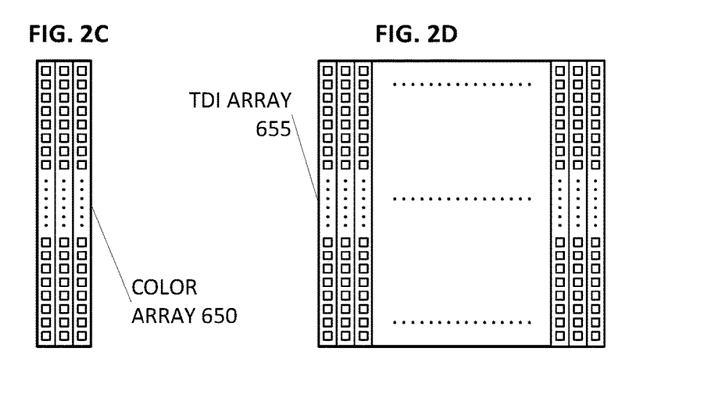
FIG. 2C is a block diagram illustrating an example line scan camera having three linear arrays.
FIG. 2D is a block diagram illustrating an example line scan camera having a plurality of linear arrays.

FIG. 2C illustrates a line scan camera having three linear arrays, each of which may be implemented as a CCD array. The three linear arrays combine to form a color array 650. In an embodiment, each individual linear array in the color array 650 detects a different color intensity, (e.g., red, green, or blue). The color image data from each individual linear array in the color array 650 is combined to form a single field of view 625 of color image data.

FIG. 2D illustrates a line scan camera having a plurality of linear arrays, each of which may be implemented as a CCD array. The plurality of linear arrays combine to form a TDI array 655. Advantageously, a TDI line scan camera may provide a substantially better SNR in its output signal by summing intensity data from previously imaged regions of a specimen, yielding an increase in the SNR that is in proportion to the square-root of the number of linear arrays (also referred to as integration stages). A TDI line scan camera may comprise a larger variety of numbers of linear arrays. For example common formats of TDI line scan cameras include 24, 32, 48, 64, 96, 120 and even more linear arrays.

The above description of the disclosed embodiments is provided to enable any person skilled in the art to make or use the invention. Various modifications to these embodiments will be readily apparent to those skilled in the art, and the generic principles described herein can be applied to other embodiments without departing from the spirit or scope of the invention. Thus, it is to be understood that the description and drawings presented herein represent a presently preferred embodiment of the invention and are therefore representative of the subject matter which is broadly contemplated by the present invention. It is further understood that the scope of the present invention fully encompasses other embodiments that may become obvious to those skilled in the art and that the scope of the present invention is accordingly not limited.

What is claimed is:

1. A method for viewing digital pathology images, where one or more processors are programmed to perform steps comprising:
    prior to providing a first color monitor having a unique serial number to a recipient for use as a viewing device for digital pathology images, configuring a plurality of variables of the first color monitor to an approved settings state;
    storing the unique serial number in association with an indication that the first color monitor has been configured to the approved settings state;
    in response to a request to display digital pathology image data on the first color monitor,
        prior to displaying the digital pathology image data, calibrating the first color monitor by
            obtaining the unique serial number of the first color monitor from the first color monitor and matching the unique serial number to the previously stored unique serial number,
            obtaining current variable settings from the first color monitor,
            comparing the current variable settings to variable settings of the approved settings state, and,
            if a difference between the current variable settings and the variable settings of the approved settings state exceeds a predetermined threshold, configuring the plurality of variables of the first color monitor to the approved settings state, and,
        after calibrating the first color monitor, providing the requested digital pathology image data for display on the first color monitor; and,
    while the digital pathology image data continues to be displayed, periodically
        obtaining current variable settings from the first color monitor,
        comparing the current variable settings to the variable settings of the approved settings state, and
        if the current variable settings are different from the variable settings of the approved settings state, configuring the plurality of variables of the first color monitor to the approved settings state.

2. The method of claim 1, wherein the plurality of variables comprises monitor control command set (MCCS) variables.

3. The method of claim 1, wherein the plurality of variables comprises international color consortium (ICC) variables.

4. The method of claim 2, wherein configuring a plurality of variables of the first color monitor to an approved settings state comprises setting each MCCS variable to a desired value.

5. The method of claim 2, wherein configuring a plurality of variables of the first color monitor to an approved settings state comprises initializing the first color monitor to a factory state and setting fewer than all of the MCCS variables to a desired value.

6. The method of claim 1, wherein configuring a plurality of variables of the first color monitor to an approved settings state comprises generating an international color consortium (ICC) profile for the first color monitor.

7. The method of claim 1, wherein configuring a plurality of variables of the first color monitor to an approved settings state comprises applying an international color consortium (ICC) profile corresponding to a stock keeping unit (SKU) number for the first color monitor.

8. A system comprising:
    at least one hardware processor; and
    one or more software modules that are configured to, when executed by the at least one hardware processor,
        prior to providing a first color monitor having a unique serial number to a recipient for use as a viewing device for digital pathology images, configure a plurality of variables of the first color monitor to an approved settings state, store the unique serial number in association with an indication that the first color monitor has been configured to the approved settings state, in response to a request to display digital pathology image data on the first color monitor,
prior to displaying the digital pathology image data, calibrate the first color monitor by
obtaining the unique serial number of the first color monitor from the first color monitor and matching the unique serial number to the previously stored unique serial number,
obtaining current variable settings from the first color monitor,
comparing the current variable settings to variable settings of the approved settings state, and,
if a difference between the current variable settings and the variable settings of the approved settings state exceeds a predetermined threshold, configuring the plurality of variables of the first color monitor to the approved settings state, and,
after calibrating the first color monitor, provide the requested digital pathology image data for display on the first color monitor, and,
while the digital pathology image data continues to be displayed, periodically obtain current variable settings from the first color monitor,
compare the current variable settings to the variable settings of the approved settings state, and
if the current variable settings are different from the variable settings of the approved settings state, configure the plurality of variables of the first color monitor to the approved settings state.

9. A non-transitory computer-readable medium having instructions stored thereon, wherein the instructions, when executed by a processor, cause the processor to:
prior to providing a first color monitor having a unique serial number to a recipient for use as a viewing device for digital pathology images, configure a plurality of variables of the first color monitor to an approved settings state;
store the unique serial number in association with an indication that the first color monitor has been configured to the approved settings state;
in response to a request to display digital pathology image data on the first color monitor,
prior to displaying the digital pathology image data, calibrate the first color monitor by
obtaining the unique serial number of the first color monitor from the first color monitor and matching the unique serial number to the previously stored unique serial number,
obtaining current variable settings from the first color monitor,
comparing the current variable settings to variable settings of the approved settings state, and,
if a difference between the current variable settings and the variable settings of the approved settings state exceeds a predetermined threshold, configuring the plurality of variables of the first color monitor to the approved settings state, and,
after calibrating the first color monitor, provide the requested digital pathology image data for display on the first color monitor; and,
while the digital pathology image data continues to be displayed, periodically obtain current variable settings from the first color monitor,
compare the current variable settings to the variable settings of the approved settings state, and
if the current variable settings are different from the variable settings of the approved settings state, configure the plurality of variables of the first color monitor to the approved settings state.

\* \* \* \* \*